United States Patent [19]

Tonomura et al.

[11] 4,377,155
[45] Mar. 22, 1983

[54] SOLAR ENERGY COLLECTOR ASSEMBLY

[75] Inventors: Toshiya Tonomura, Nara; Saburo Nishiuma, Kashihara, both of Japan

[73] Assignee: Sharp Kabushiki Kaisha, Osaka, Japan

[21] Appl. No.: 48,254

[22] Filed: Jun. 13, 1979

[30] Foreign Application Priority Data

Jun. 13, 1978 [JP] Japan .................................. 53-71939
Jun. 20, 1978 [JP] Japan .................................. 53-89004

[51] Int. Cl.³ .............................................. F24J 3/02
[52] U.S. Cl. .................................. 126/443; 126/438; 126/446; 350/293; 165/183
[58] Field of Search ............... 126/438, 443, 446, 447, 126/450, 442; 350/288, 289, 296, 293, 299; 165/76, 162, 178, 183

[56] References Cited

U.S. PATENT DOCUMENTS

| 1,068,650 | 7/1913 | Harrison | 126/443 |
| 3,227,153 | 1/1966 | Godel et al. | 126/443 |
| 3,952,724 | 4/1976 | Pei | 126/443 |
| 4,091,796 | 5/1978 | Bieringer et al. | 126/443 |
| 4,124,019 | 11/1978 | Heffelfinger | 126/443 |
| 4,180,055 | 12/1979 | Hudnall | 126/443 |

FOREIGN PATENT DOCUMENTS 1108431 10/1959 France ............................ 126/443

Primary Examiner—James C. Yeung
Attorney, Agent, or Firm—Birch, Stewart, Kolasch & Birch

[57] ABSTRACT

An evacuated, one-wall tubular housing having a reflector positioned at the opposite side of the tubular housing from the radiation energy of the sun. The tubular housing includes a solar energy absorber member of a cylindrical shape, for example, and a metal tube provided for maintaining an energy absorbing media such as water in good heat transfer relationship with the absorber member. The system can improve the efficiency of the total energy collection without the need to track movement of the sun or focus the reflected radiation upon a particular point. The reflector has a curved reflecting surface corresponding to a segment of a cycloid or trochoid curve. In the case of an array of the tubular housings, the cycloid or trochoid curve of the reflecting surface is defined as a function of the tubular housing diameter and the distance between the adjacent housings.

19 Claims, 9 Drawing Figures

SOLAR ENERGY COLLECTOR ASSEMBLY

BACKGROUND OF THE INVENTION

The present invention relates to a solar energy collector assembly, and more specifically to a solar energy collector assembly comprising a tubular collector unit having a solar energy absorber member and a reflector. A nontracking type of solar energy collectors is disclosed, for example, in Japanese Preliminary Publication 53-727158 (corresponds to U.S. application Ser. No. 727158 filed by R. H. Hefflfinger on Sept. 27, 1976), in Japanese Preliminary Publication 53-24144 (corresponds to U.S. application Ser. No. 714,724 filed by R. J. Bealinger et al on Aug. 16, 1976).

Heffelfinger discloses a solar collector unit comprising an evacuated, double-glass walled, tubular housing, a coating disposed on the outer surface of the inner glass tube and made of a material highly absorbent of solar rays; a tubular sheet metal fin contained within the housing and biased against the inner wall of the housing, and a metal tube provided to allow water to flow therein in good heat transfer relationship with the fin. While being advantageous to collect sufficiently solar energy independently of the incidence angle thereof, the above described collector unit experiences the following problems:

(1) Material cost was relatively high;
(2) The tubular collector unit was relatively difficult to manufacture because the evacuated, double-glass walled tubular housing was complicated in structure; and
(3) The tubular collector unit gave unsatisfactory heat transfer relationship between the tubular sheet metal fin and the inner glass wall because each of the fin and the inner glass wall might be bent or rough along its axial length, thus reducing the efficiency of solar energy collection.

SUMMARY OF THE INVENTION

It is an object of the present invention to provide a highly efficient solar energy collector assembly without tracking the movement of the sun.

It is a further object of the present invention to provide a solar energy collector assembly with reduced manufacture cost. The solar energy collector of the present invention is easy to manufacture and suitable for mass production through the use of relatively inexpensive raw materials.

It is a still further object of the present invention to provided reflectors for collecting solar energy. The reflector has a trochoid or cycloid curve surface in cross-section such that an increase in the tube-to-tube spacing in the solar energy collector assembly would not result in optical loss for incidence rays.

DESCRIPTION OF THE PREFERRED EMBODIMENTS

Figure 1:
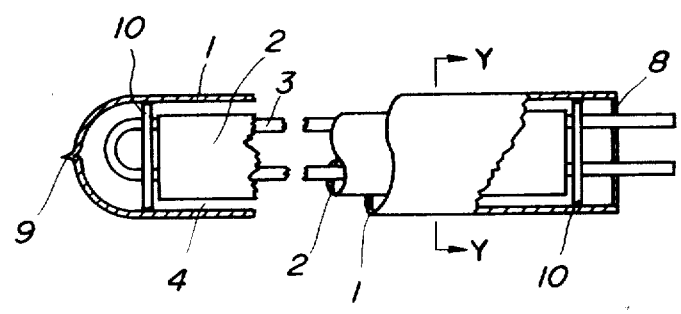
FIG. 1 shows a fin and tube arrangement according to the present invention with a tubular housing partially broken away.
Figure 2:
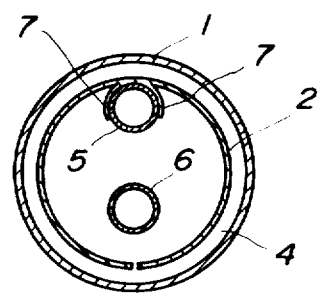
FIG. 2 is a cross-section of FIG. 1.

Referring to FIGS. 1 and 2, a one-walled tubular housing 1 is transparent and preferably glass such as borosilicate or soda lime. Inside the tubular housing 1 there is provided a hollow elongated metal absorber member 2 (which will hereafter be referred to as a tubular fin) of an outer diameter smaller than the inner diameter of the tubulars housing 1, providing an annular space 4 between the tubular fin 2 and the tubular housing 1. The tubular fin 2 and the tubular housing 1 are cylindrical and disposed coaxially with respect to each other.

An outer surface of the tubular fin 2 preferably has a coating with a high absorbtivity and a low emissivity to maximize the quantity of radiation which will be absorbed in the form of heat by the tubular fin 2. The metal tube 3 which is preferably made of a metal material such as copper is provided to carry fluid such as water which is to be heated with the heat derived from solar radiation. As shown in FIGS. 1 and 2, the tube 3 has "U" shaped configuration within the tubular housing 1 and is provided in good heat transfer relationship with the fin 2. In accordance with the present invention, the upper leg 5 (as viewed in FIG. 2) of the tube 3 transfers heat to the water therein. With the arrangement shown in FIG. 2, the tubular fin 2 comprises a pair of inner binders 7 in the center thereof to hold the upper leg 5 of the tube 3. Element 6 represents the lower leg of tube 3.

Figure 8:
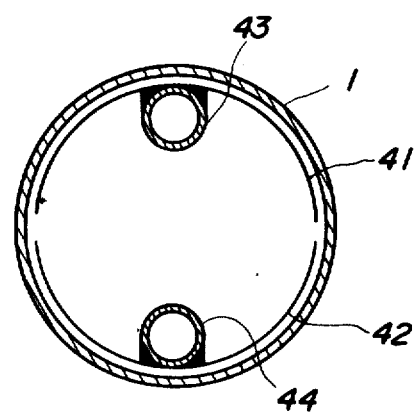
FIGS. 8 and 9 are cross-section views of further embodiments of the solar energy collector elements.
Figure 9:
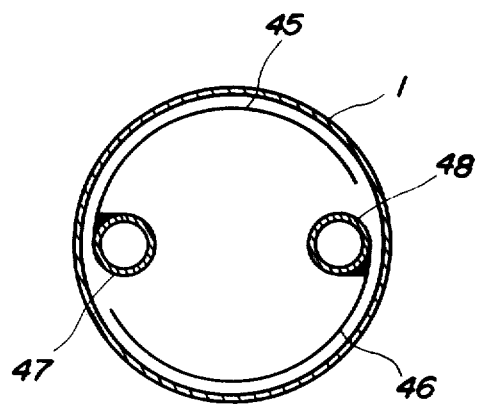

In FIGS. 8, 9, another fin configuration is illustrated. In FIG. 8, a pair of semi-cylindrical metal fins 41, 42 are disposed face to face within the tubular housing 1. Each leg 43, 44 of a "U" shaped metal tube within the tubular housing 1 is respectively fixed to the center of the each semi-cylindrical metal fin 41 and 42.

In FIG. 9, a pair of semi-cylindrical metal fins 45 and 46 are disposed face to face within the tubular housing 1. Each of the fins 45, 46 has a leg 47, 48 of a U-shaped metal tube within the tubular housing 1 to be fixed at the edge of each fin 45, 46. The use of the fin 41, 42 or 45, 46 makes it easy to connect the "U" shaped metal tube.

In FIG. 2, a conventional way to enhance thermal coupling between the tubular fin 2 and the tube 3 may involve the bonding of the both by a welding or flashing method. In addition the metal tube 3 is extruded with fluid conduit means such as an aperture formed as an integral part. The collector further includes a seal 8 to enclose an opening on one side of the tubular housing 1. The seal 8 and an outside portion of the seal and tube 3 are welded together and a circular outside of the seal 8 and tubular housing 1 are fused together, with the other side 9 of the tubular housing 1 being pinched off. The space in the tubular housing 1 is evacuated to minimize heat transfer loss from the fin 2 to the housing 1.

If desired, a getter may be included in the evacuated cavity to absorb any residual or objectionable gases. Two coil spacer arrangements 10, 10 are respectively provided to maintain the spaced relationship of the inner surface of the tubular housing 1 and the outer surface of the tubular fin 2. In this embodiment, on the both sides of the housing 1, one end of said spacer 10 is fixed to a portion of the tube 3, the other end of the spacer being biased against the inner surface of tubular housing 1.

The tubular fin 2 and the tubular housing 1 are disposed coaxially with respect to each other by the two spacers 10, 10.

Figure 3:
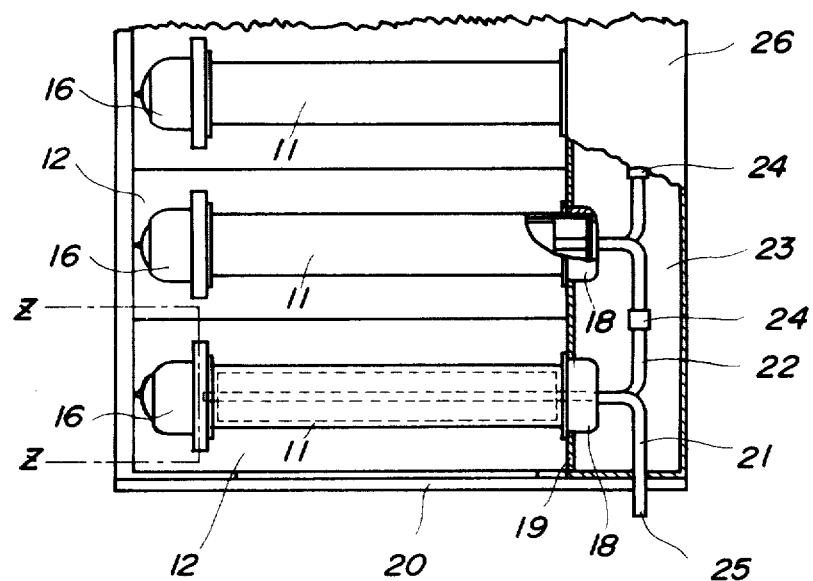
FIG. 3 is a plan view of a portion of an array of tubular solar energy collectors.

FIG. 3 shows a plan view of a portion of an array of the aforesaid tubular solar energy collector units. A solar energy collection unit 11 is of the same structure as in FIGS. 1 and 2. As shown the FIGS. 3, 4 concurved radiation reflectors 12, 12 mounted on an appropriate base 13 such as a roof of a building by supporting means 14, respectively support the solar collector elements 11 as well as reflecting solar radiation back upon them.

The reflector 12 may be made of any material having a mirror like surface and having a trochoid or cycloid curved cross-section.

A support 15 maintains the space between the tubular housing 1 of the solar collector element 11 and the surface of the reflector 12.

A circular end protector 16 surrounds the tubular housing 1 at one side thereof. If desired, a circular cushion (not shown) for example rubber or the like may be disposed between the tubular housing 1 and the circular end protector 16. A band 17, which may be metal, depresses the left end of the solar collector element 11, while the other end of the protector 18, which may be any moldable and flexible material, supports the right end of the solar collector unit 11 in an inner wall 19 of a container 20. Both sides of the band 17 are fixed to the reflector 12.

The solar collector unit 11 may include a straight tube instead of the "U" shaped tube 3. In this case, the straight tube passes through the tubular housing 1.

The straight tube is formed integrally by a flexible joint made of material such as phosphor brone, in order to absorb the difference in thermal expansion and contraction along its axial length between the metal tube and the glass-wall tubular housing 1. Both end openings of the housing are hermetically sealed with each seal arrangement to provide a vacuum operating condition in the housing. A inlet 21 of the tube 3 and an outlet 22 of the tube 3, projecting from the housing 1 are positioned in a manifold 23 of the container 20. By the use of joints 24 formed by conventional plumbing techniques such as sweating, a plurality of the tubes 3 leading from separate solar collector units 11, 11 can be joined into a single leak-free conduit. It is desirable that the joint 24 be made of a metal material such as copper, from the standpoint of mechanical endurance, or a plastic joint such as a silicon rubber tube, in view of its heat resistance properties. The heat transfer media flowing into the tube 3 from a inlet opening 25, travels in sequence through all of the solar collector units 11, 11 to be heated within the tubes 3, 3 and flows down from an outlet (not shown). A cover 26 protects the manifold 23 from the weather, dust, etc.

Figure 4:
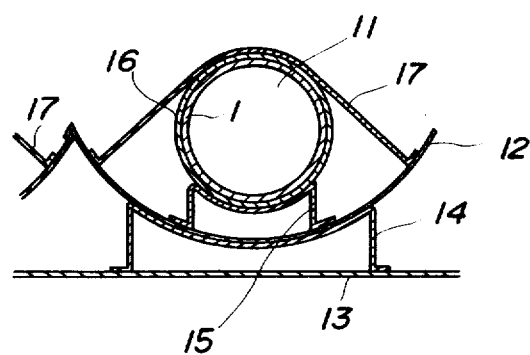
FIG. 4 is a sectional view taken along the line Z—Z of FIG. 3.
Figure 5:
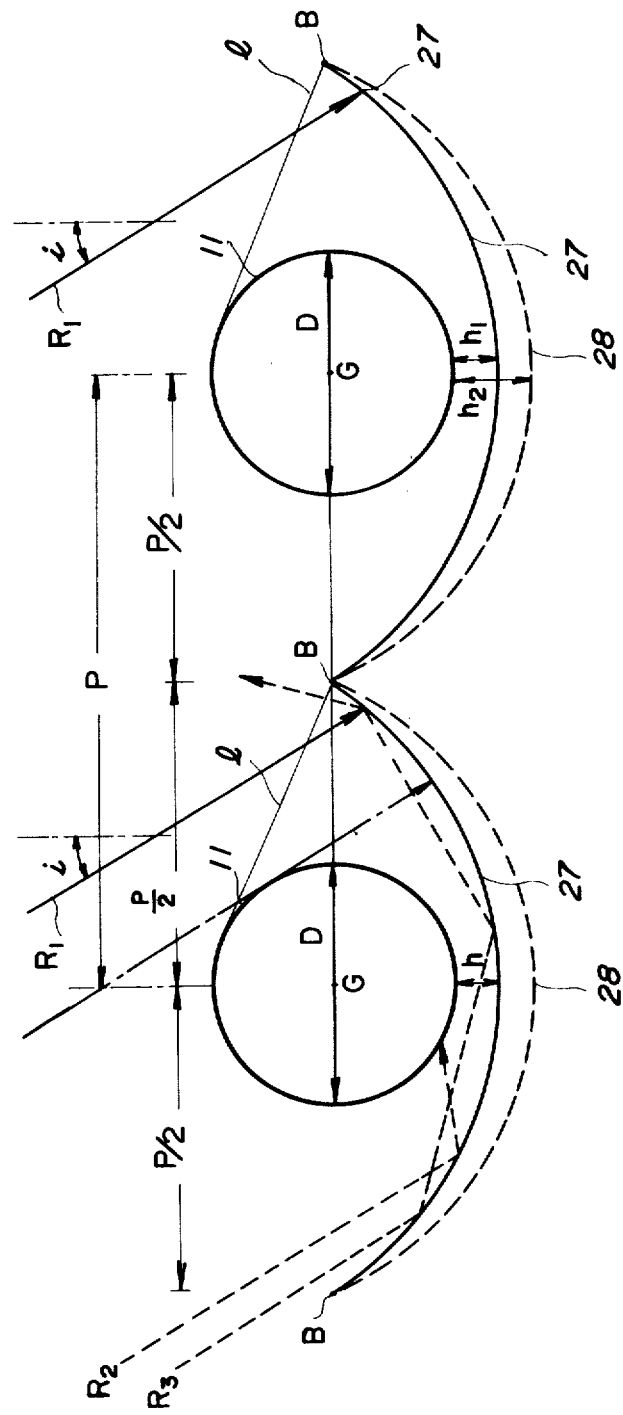
FIG. 5 is a schematic and elevational view of the invention for illustrating its operational principles.
Figure 6:
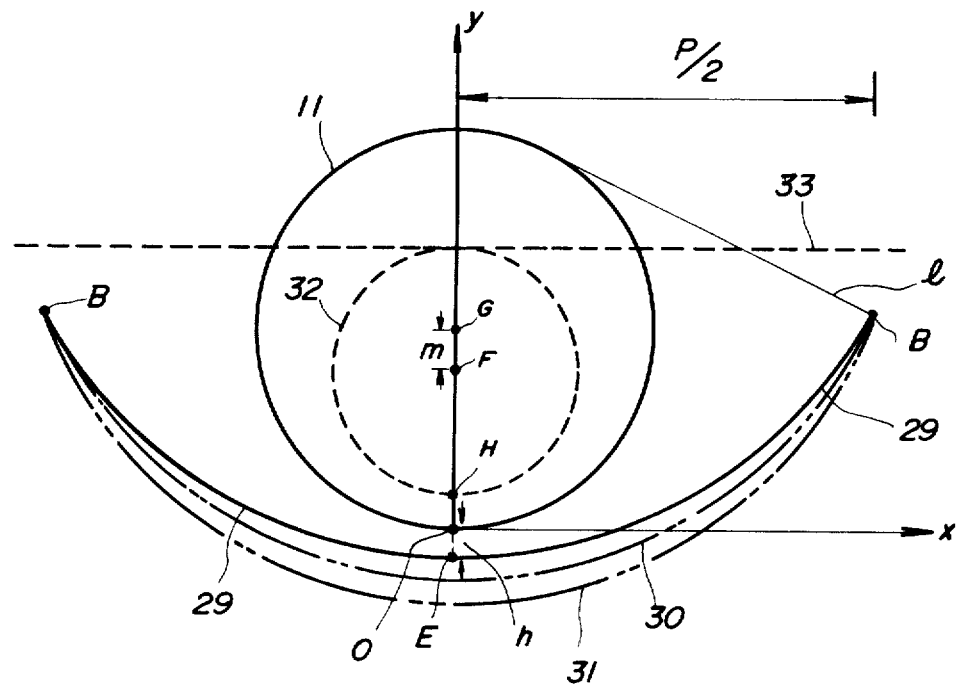
FIG. 6 is a schematic view of the invention for illustration of how to draw a trochoid or cycloid curve.

In FIG. 4, the reflector 12 having a cycloid curve cross-section has been found to improve significantly the performance of collecting sun rays than the above-mentioned cylindrical reflector. The reflector 12 is of the nonfocusing type and results in moderate concentration ratios. Furthermore, the solar collector units 11, 11 are spaced parallel to each other and the reflectors 12, 12 corresponding to the adjacent units 11, 11 are fastened together in an edgewide fashion by suitable interlocking means (not shown). FIG. 5 and FIG. 6 illustrate in a schematic fashion the principles upon which the reflector 12 operates. In FIG. 5, there is shown the solar collector unit 11 with a portion thereof corresponding to the tubular housing 1. A cycloid curve 27 indicates the reflecting surface of the reflector 12 and a curve 28 indicates a segment of an arc. Further the outside diameter of the element 11 is denoted as D and the center-to-center spacing of the elements 11, 11 is denoted as P. Each end of the curve 27 (corresponding to the reflector 12) is positioned about a specific middle point B of the straight line G-G. A normal line l at the point B of the curve 27 is circumscribed with the unit 11 at one point only (called a tangent).

In FIG. 5, radiation from the sun R1 is incident upon the surface of the ground, of which component includes collimated beams of light indicated by the angled line "i". The collimated beam component swing by an angle "i" in a range of from 90°-0 and 0-90° in a corresponding angle at the other side. The solar radiation R1 falls upon an intercept area of the unit 11 and to either side of the area. Collimated beams directed outside the intercept area strike one of the reflectors 12, and the incident light radiation is reflected toward the reflector 12 and then strikes the underside of the absorber surface of the unit 11 as illustrated by the dotted line R2 in FIG. 5.

Consequently, the performance of the unit 11 is remarkably improved by the reflector 12, but there are still a very little amount of light such as R3 that passes through a gap h between the element 11 and the cycloid curve 27 and goes outside. The light R3 can be regarded as optical loss.

It will now be explained how to form a trochoid or cycloid curve defining the surface of the reflector 12 referring to FIGS. 5 and 6. In FIG. 6, numerals 29, 30, 31 represent various trochoid curves. A cycloid curve 27 is generated by a point H fixed on the circumference of a circle 32 (having a suitable constant diameter) which rolls without slipping on a straight line 33.

And, a trochoid curve such as 29 is generally traced by a point E rigidly connected with, but not generally on the circumference of the circle 32 which rolls without slipping upon a right line 33.

As shown in FIG. 6, assuming that an X-axis and a Y-axis intersecting at a specific point (called "zero point") of the outer surface of the unit 11 using the turning angle $\theta$ of the circle 32 for a parameter, the ordinary trochoid curves can be defined as follows:

$$X = a\theta + k \sin \theta \quad (1)$$

$$Y = a - k \cos \theta + \epsilon \quad (2)$$

wherein "a" is the radius of the circle 32, k is the distance between a fixed point E and a center point F of the circle 32. If m is the distance between the center point G and the center point F, D is the diameter of the unit 11, $\epsilon$ can be written as:

$$\epsilon = \frac{D}{2} - (m + a) \quad (3)$$

The gradient r of the normal line on the trochoid curve 29 is as follows:

$$r = -\frac{(1 + a\cos\theta)}{2a \sin\theta} \quad (4)$$

Wherein $$a = k/a \quad (5)$$

When the point E is coincident with the end point B of the reflector (i.e. the point B is the center of line GG), under the condition that the angle $\theta = \theta c$, the gradient $\gamma = \gamma c$ i at the point B and the gradient $\gamma c$ is defined as:

$$\gamma_c = -\frac{(1 + a \cos\theta_c)}{2a \sin\theta_c} \quad (6)$$

Further considering the conditions which the normal line 1 at the point B is tangent to a specific point of the outer surface of the unit 11, $\gamma c$ is defined as:

$$c = \pm \frac{R}{P^2 - R^2} \quad (7)$$

Accordingly, $\theta c$ is given by the formulas (5) and (6). Under the condition that each trochoid curve intersects on the point B, "a" and "m" can be defined as:

$$a = \frac{P}{\theta c + a\sin\theta c} \quad (8)$$

$$m = -aa \cos \theta c \quad (9)$$

As described above, when the spacing GG between the adjacent units 11, 11 is P and the outside diameter of the element 11 is $D$, the trochoid curves 29-31 in groups satisfying the conditions described above can be given in accordance with a further value of additional $\alpha$ within the range of $0.9 \leq \alpha < \infty$, the trochoid curve satisfies the conditions, but for $\alpha \geq 10$ the trochoid curve is approximately coincident to an arc segment of a circle. Consequently, it is commonly disirable to use trochoid curved defined in the range of from 0.9 to about 10. Especially, when $\alpha = 1$, the trochoid curve is coincident to the cycloid curve 27 and the gap between the tube unit 11 and its curve 27 (the dimension h on FIGS. 5 and 6) becomes the smallest. Therefore, if P=constant, when the reflector 12 has a cycloid curve 27 in cross-section satisfying the above conditions, as shown in FIG. 5, the optical loss such as R3 passing through the gap h and emitted outside is reduced to a minimum and the collection efficiency is a miximum.

Figure 7:
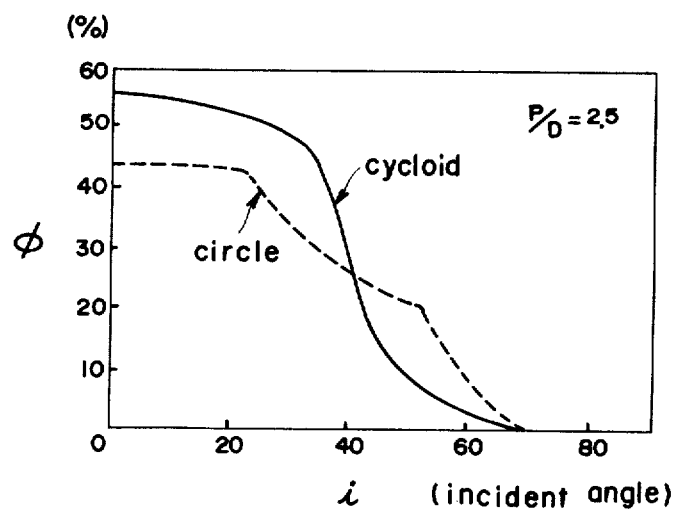
FIG. 7 is a chart of the efficiencies "$\phi$" of the energy collection versus the incident angle "i" of the solar rays in the collector, the curve showing comparison between the performance of the present invention and the prior art cylindrical reflector assembly.

Referring to FIGS. 5 and 7 the performance of the reflector 15 is compared with the performance of the cylindrical reflector.

In FIG. 5, the numeral 27 indicates a cycloid curve of P/D=2.5, the numeral 28 indicates a cylindrical reflector described in afore-mentioned application by Bearlinger et al, "h1" is the gap between the cycloid curve 27 and the unit 11, "h2" is the gap the cylindrical reflector 28 and unit 11. h1 is normally smaller than h2, and the greater the difference (h2−h1), the greater P/D.

For example, when D=100 mm, P=250 mm, h1=18.8 mm, said h2=31.8 mm, j1 is reduced by 40% as compared to h2. Thus, it has been found that reflector 12 can improve significantly the performance of solar collection in comparision with the cylindrical reflector. FIG. 7 shows a chart of the quantity $\phi$ versus the incident angle "i" of the sun radiation wherein $\phi$ is the fraction of beam light incident on the area of width p that is ultimately reflected toward the absorber tube (i.e. the unit 11). [note: in this case the tube axes are in a north-south orientation in the foregoing disclosure.]

Referring to FIG. 7, it has also been found that the cycloid reflector 12 has the higher performance for collecting the sun radiation than the cylindrical reflector, when "i" is small, that is, the strength of the sun radiation is stronger (about 9:00 a.m.-3:00 p.m.)

While particular embodiments of the invention have been illustrated and discrived, it will be obvious that changes and modifications can be made without departing from the spirit of the invention and the scope of the appended claims.

What is claimed is:

1. A solar energy collector apparatus comprising:
   (a) a tubular collector means comprising in combination:
      an evacuated tubular housing having a cylindrical shape;
      a solar energy metal absorber member comprising a hollow elongated metal sheet disposed within said tubular housing substantially co-axial to said tubular housing, and having an outer diameter smaller than the inner diameter of said tubular housing for defining an annular space therebetween;
      means for maintaining said annular space;
      an absorbing media-containing metal conduit means disposed for contact with at least a portion of the solar energy absorber member, thereby maintaining the absorbing media contained in said metal conduit in good heat transfer relationship with said solar energy absorber member; and
   (b) a reflector means having a concave reflecting surface facing one side of said tubular collector means.

2. The solar energy collector apparatus in accordance with claim 1, wherein said metal absorber member is provided on the outer surface thereof with a coating possessing a high absorbtivity for solar energy and a low emissivity.

3. An array of the solar energy collector apparatus of claim 1 comprising:
   a plurality of spaced parallel tubular collector means having substantially the same outside diameter;
   a reflector means operatively associated with each of said tubular collector means, and
   means for connecting said plurality of said collector means and said reflector means into a single, leak-free unit.

4. The solar energy collector array of claim 3, wherein said conduit means is made of metal which possesses a great thermal conductivity.

5. The solar energy collector array of claim 4, wherein said conduit has both its inlet and outlet at the same end of said tubular housing.

6. The solar energy collector array of claim 5, wherein said conduit tube has a "U" shaped configuration and is disposed inside of said tubular housing.

7. The solar energy collector array of claim 6, wherein said U-shaped metal tube has a first leg supported on said fin, and a second leg passing through the inner space of said cylindrical fin.

8. The solar energy collector array of claim 4, wherein said conduit tube has its inlet and outlet at opposite ends of said tubular housing.

9. The solar energy collector array of claim 4, wherein the solar energy absorber member has a cylindrical metal fin-type configuration and said conduit tube is fixed to the inner surface portion rather than the outer surface of said cylindrical metal fin.

10. The solar energy collector array of claim 1, wherein said spacer arrangements are positioned on both inside ends of said tubular housing.

11. The solar energy collector array of claim 10, wherein said spacer arrangements are disposed between the inner surfaces of said housing and said metal tube.

12. The solar energy collector apparatus of claim 1 wherein said solar energy absorber member has a cylindrical metal fin-type configuration and said absorbing media conduit means has a U-shaped configuration, said cylindrical metal fin-type configuration comprising a pair of separate semi-cylindrical metal sheets, each of which being fixed to one leg of said U-shaped conduit means.

13. The solar energy collector of claim 12, wherein, each of said two legs of said "U" shaped tube is fixed to the center portion of each surface of said semi-cylindrical fins whereby said semi-cylindrical fins define a cylindrical configuration.

14. The solar energy collector of claim 12, wherein each of said two legs of the "U" shaped tube is fixed to one edge portion of said semi-cylindrical fins respectively, whereby said semi-cylindrical fins define a cylindrical configuration.

15. A solar energy collector apparator comprising:
(a) a tubular collector means comprising in combination;
   a tubular housing;
   a solar energy metal absorber member disposed within said tubular housing
   an absorbing media-containing metal conduit means disposed for contact with at least a portion of the solar energy absorber member; and
(b) an elongated reflector having a reflecting surface defining a segment of a cyloid or trochoid curve and positioned on a side of said tubular collector more remote from the sun.

16. An array of the solar energy collector apparatus of claim 15, comprising a plurality of spaced-apart tubular collector means having the same outside diameter, a plurality of reflectors provided for each of said tubular collector means, and a plurality of said conduit means assembled into a single, leak-free unit.

17. The solar energy collector array of claim 15, wherein:
(a) the center line or axis of the outer surface of said reflector is substantially located along a line extending vertically from the center axis of said element,
(b) each of the ends of said reflector is positioned about a middle point of a straight line between the center axes of said adjacent elements, said reflector has a reflecting surface defining a cycloid or trochoid curve, and
(c) a normal line extending from each of the side edges of said reflector being circumscribed by the outer surface of said element at only one point.

18. The solar energy collector array of claim 17, wherein said collector means comprises an evacuated transparent tubular housing, said solar energy absorber member comprises a metal fin disposed within said tubular housing, said fin being provided with a high absorptive coating, and said conduit means is engaged in good heat transfer relationship with said fin.

19. The solar energy collector array of claim 18, wherein said fin has a cylindrical shape and is disposed within said housing, thus providing an annular space between said fin and said housing.

* * * * *